Jan. 19, 1932. M. LOUGHEAD ET AL 1,841,615
HYDRAULIC BRAKE SYSTEM
Filed Nov. 10, 1928 2 Sheets-Sheet 1
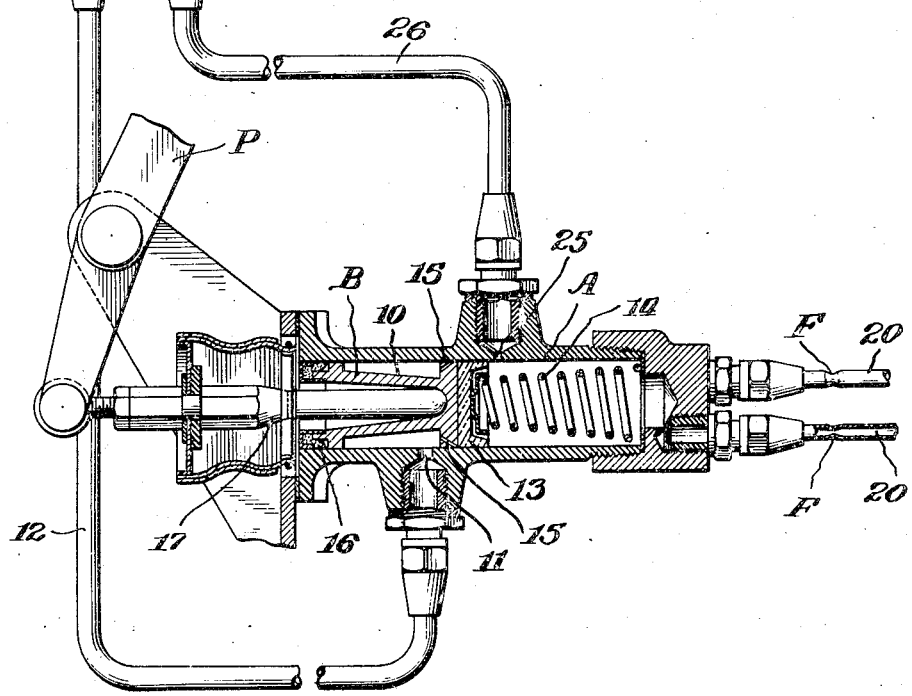
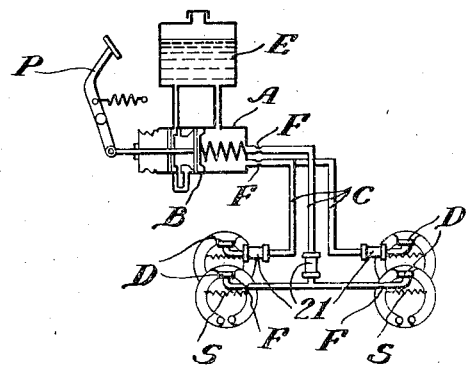
Inventor
Malcolm Loughead
Wallace F. Oliver
By Williams, Bradbury, McCaleb & Hinkle
Attys.

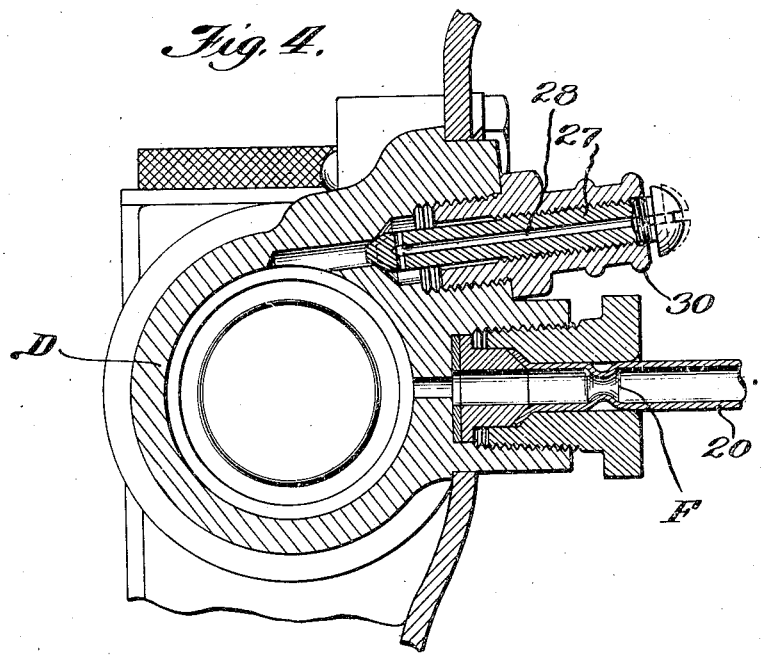
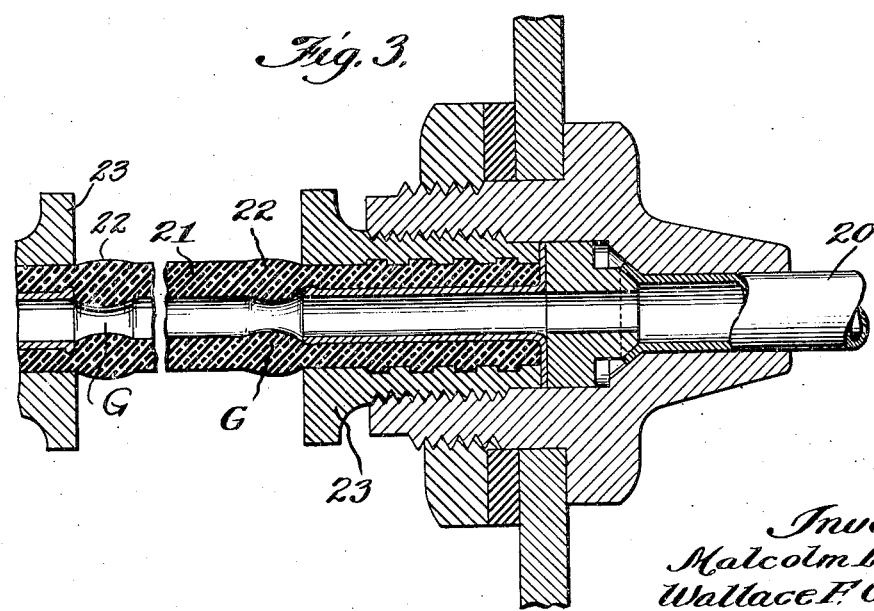

Patented Jan. 19, 1932

1,841,615

UNITED STATES PATENT OFFICE

MALCOLM LOUGHEAD AND WALLACE F. OLIVER, OF DETROIT, MICHIGAN, ASSIGNORS TO HYDRAULIC BRAKE COMPANY, OF DETROIT, MICHIGAN, A CORPORATION OF CALIFORNIA

HYDRAULIC BRAKE SYSTEM

Application filed November 10, 1928. Serial No. 318,455.

Our invention relates to improvement in hydraulic brake systems and particularly to systems wherein means is provided for eliminating air and gas bubbles from the fluid medium in the system.

Our present invention is an improvement over that type of braking system disclosed in the co-pending application of Wallace F. Oliver, bearing Serial No. 253,933, filed February 13, 1928, wherein a check valve is employed to maintain a slight positive pressure in the fluid conduits and wheel cylinders of the system at all times so that bleeding of air into the fluid system or the formation of gases therein is precluded. This check valve mechanism further operates to urge any air or gas bubbles which might be present in the operating fluid toward the master cylinder where they are forced out through the return pipe to the reserve fluid reservoir during the return of fluid from the wheel cylinder and fluid conducting conduits.

An object of our invention is to provide an improved hydraulic brake system.

Another object is to provide a hydraulic brake system embodying means for preventing the creation of a depression in the wheel cylinders or fluid conduits during the relatively quick return stroke of the master cylinder piston.

Another object is to provide a hydraulic brake system wherein the return fluid from the brake cylinders and fluid conduits is retarded to permit surplus reserve fluid to pass into the master cylinder during the return stroke of the master cylinder piston.

Another object is to provide a brake system wherein the initial introduction of brake fluid into the fluid system by successive strokes of the master cylinder piston is hastened and the admission of air to the system through the wheel cylinder bleeder valve is reduced to a minimum.

Other objects and advantages will hereinafter appear.

Our invention as illustrated in the accompanying drawings, forming a part of this specification, wherein Fig. 1 is a schematic view of the entire hydraulic brake system;

Fig. 2 is a side elevation partly in section of the master cylinder and fluid reserve reservoir;

Fig. 3 is a sectional view of a part of the fluid conduit, and

Fig. 4 is a sectional view through one of the wheel cylinders.

In general, the hydraulic brake system selected for illustration comprises a master cylinder A having a manually operated piston B for creating fluid pressure which is communicated through conduits C to each of the several wheel cylinders D forming a part of the vehicle brake shoe actuating mechanism. The system further comprises a reserve fluid reservoir E mounted above the master cylinder for supplying reserve fluid to the master cylinder, and restrictions F and G in the fluid conduit at the master cylinder and wheel cylinders D for retarding the return flow of fluid under pressure from the wheel cylinder to the master cylinder upon the return stroke of the piston B.

The piston B of master cylinder A is elongated and has a deep circumferential recess 10 in its outer wall communicating at all times with a fluid inlet 11 which is connected by a pipe 12 with the reserve fluid reservoir E. The piston B further comprises a loose packing cup 13 which normally bears against the inner end wall of the piston by virtue of a compression spring 14 disposed between the innermost end of the cylinder A and the adjacent face of the packing cup. A plurality of passages 15 through the inner end wall of the piston B and communicating with the recess 10 permits fluid to pass from the recess 10 about packing cup 13 into the forward end of the cylinder A upon the creation of a differential in pressure between the fluid in recess 10 and the fluid in the forward end of the cylinder. A suitable packing 16 is provided for the outer end of piston B which has only to form a fluid tight seal at substantially atmospheric pressure.

The brake operating foot pedal P is connected through a push rod 17 with piston B so that pressure thereupon will cause a compression stroke of the piston in cylinder A. Fluid pressure thus built up is communicated through the conduits C comprising lengths of copper tubing 20 including short flexible hose sections 21, one for each of the two front wheel brakes to the wheel cylinders D for actuating the brake shoes through mechanism well known in the art.

Upon the return stroke of piston B urged by spring 14 a differential in pressure between the fluid in recess 10 and pipe 12 and the fluid in cylinder A in front of the piston, is created which causes fluid to pass through passages 15 and to pass the packing cup 13 into the forward end of the cylinder. The creation of this differential in pressure is made possible by the restrictions F and G in the copper tubing 20 and in the hose section respectively (Figures 4 and 3 respectively) which act to retard the normal flow of fluid back to the master cylinder by pressure exerted thereupon as the pistons within the wheel cylinders recede under the force of the brake shoe retractile springs S.

In Figs. 2 and 4 we have illustrated the restrictions as comprising inwardly rolled beads in the copper tubing 20 forming the major part of the fluid conduit. In Fig. 3 we have illustrated the restrictions comprising a flexible hose 21 with its inwardly extruded portion 22 of the flexible material. This inwardly extruding portion 22 is a natural characteristic of flexible hoses of the type wherein the end coupling 23 tightly compresses the hose ends to effect a fluid tight connection therewith.

As the end couplings 23 at each end of the hose 21 are alike, hose 21 constitutes a restriction at the front wheel cylinders regardless of which end of the hose is connected to the cylinder (Figure 3).

In Fig. 4 we have illustrated one of the wheel cylinders D of the rear two brake assemblies wherein the copper tubing 20 is connected directly to the wheel cylinder and has a restriction F formed therein, as described.

While we have here shown restrictions in the conduits C both at the wheel cylinders and at the master cylinder A, it should be understood, of course, that either set of restrictions may be dispensed with, if desired, without materially affecting the operation of the system, though the positioning of the restrictions at the master cylinder and at the wheel cylinders each has a peculiar significance.

The restriction F at the master cylinder constitutes means for retarding the return flow of fluid into cylinder A upon the return stroke of piston B and therefore functions to maintain during the return stroke of the piston positive pressure throughout the entire fluid system beyond the master cylinder A, so that there is no tendency for gases to form by the communication of depression from the master cylinder to the fluid system therebeyond.

As the brake fluid commonly used in hydraulic brakes consists of castor oil and alcohol, there is a tendency to form alcohol vapor bubbles in the fluid, particularly in warm weather, if the fluid is subjected to relative depression in pressure.

A further function of the restriction F at the master cylinder is to assure movement of reserve fluid past the piston packing 13 into the forward end of the cylinder A, where this reserve fluid co-mingles with fluid returning from the conduit C and the wheel cylinders with any air or gas bubbles which might exist therein and is conducted from the master cylinder A to the fluid reservoir E through a restricted opening 25 in the side wall of cylinder A just in front of the piston packing 13 by means of a pipe 26 interconnecting the restricted opening 25 and the reservoir E. During the compression stroke of the piston B to build up fluid pressure in cylinder A, the opening 25 is shut off by the advance of piston B beyond the opening. At times opening 25 is in communication with the recessed portion of piston B but because of its small size very little fluid will pass into the recess 10 which will receive most of its fluid from the larger inlet 11.

The restrictions F and G at the wheel cylinders are of particular importance in connection with the initial introduction of fluid to the fluid system. For this purpose a normally closed bleeder valve 27 at each wheel cylinder is employed to permit air to escape from the fluid system as it is displaced by the fluid pumped into the system by successive movement of the piston B. It has been found, however, that some means must be provided for preventing the return of air through the bleeder valve to the wheel cylinders upon the return stroke of piston B. Otherwise the pumping of fluid into the system by the master piston movement is prevented. We have overcome this difficulty by providing the restrictions F and G at the wheel cylinders, so that the return movement of fluid from the wheel cylinders to the conduit C and cylinder A is retarded upon the return stroke of piston B and but very little air can be drawn back into the cylinder D from the bleeder valve 27.

It is thus possible by continued successive movement of piston B to force all of the air out of the system through the restricted passage 28 of the bleeder valve 27 when open. This condition is made known to the operator upon the extrusion of fluid through the bleeder valve at which time the valve should be closed and the system is ready for use.

Our improved hydraulic brake system, in operation, is initially supplied with brake fluid by filling the reserve reservoir E with brake fluid. This fluid commonly consists of a mixture of castor oil and alcohol. The operator will then open a bleeder valve 27 on each of the wheel cylinders D. The operator then presses the foot pedal P intermittently to cause successive compression strokes of piston B in cylinder A. On each compression stroke the fluid which has sought its way to cylinder A will be forced out of cylinder A through restriction F in tubes 20 and there along into wheel cylinder D. As the fluid enters wheel cylinders D air is expelled through the restricted openings 28 in the bleeder valves 27. Upon each return stroke of piston B by virtue of the compression spring 14, fluid from the recessed portion of piston B will be drawn through openings 15 past the packing cup 13 into the forward end of the cylinder because of the differential in pressure between the fluid on each side of the piston. This differential in pressure is made possible because of the restrictions F and G which retard the return of fluid to the cylinder through a tendency to follow the piston and through the force exerted by the wheel brake shoe springs, as described.

Since but a slight quantity of fluid returns to cylinder A during the return stroke of piston B, but a very slight quantity of air will be drawn into wheels cylinders D through the bleeder valve as compared with the large quantity of air expelled at each compression stroke.

After all of the air has been thus expelled from wheel cylinders D and replaced with brake fluid, as evidenced by the passage of fluid through the bleeder valves, the valves are closed and the system is ready for operation.

The tendency to create bubbles of gas or alcohol vapor in the fluid system is materially decreased by the restriction F at the master cylinder which serves to constantly maintain the fluid system beyond the cylinder at slight depression, particularly at that time during which the master cylinder is under a slight depression upon the return stroke of its piston. When the system is idle the weight of the fluid column above the master cylinder A equivalent to the distance between the cylinder and the fluid level in the tank E exerts and maintains slight positive pressure throughout the entire system, which is sufficient to prevent seepage through the packing in the wheel cylinders, and to discourage the formation of gas bubbles.

Air and vapor bubbles are expelled from the fluid system with that surplus fluid which passes through opening 25 to reserve tank E after piston B is at the end of its return stroke, which movement of fluid is produced by the gradual return of the operating fluid from the wheel cylinders through conduits C. This operation takes place each time the brakes are applied.

We have found by experiment that without the restrictions F or some other means as check valves or the like to retard the return flow of fluid to the master cylinders, that the elimination of air and vapor from the system cannot be successfully carried out.

What we claim is new and desire to secure by Letters Patent of the United States is:

1. In a hydraulic brake system, a fluid pressure producing device, brake shoe actuating means responsive to the movement of fluid under pressure and a conduit interconnecting said pressure producing device with said brake shoe actuating means, said conduit having a restriction therein to retard the flow of fluid therethrough.

2. In a hydraulic brake system, a fluid pressure producing device, brake shoe actuating fluid motors including a piston movable upon the application of pressure fluid, a spring for returning the piston to its normal position, and a conduit interconnecting the fluid pressure producing device with said fluid motors, said conduit having a restriction therein to retard the flow of fluid to the pressure producing device urged by the force of said spring upon said piston.

3. In a hydraulic brake system, a fluid pressure producing device, brake shoe actuating fluid motors, and a conduit interconnecting the pressure producing device and said fluid motors including a flexible hose having portions of reduced internal cross section adjacent its ends constituting a restriction to the passage of fluid through the conduit.

4. In a hydraulic brake system, a master fluid pressure producing cylinder having a manually movable piston for building up fluid pressure therein, brake shoe actuating fluid motors including movable pistons, a conduit interconnecting said cylinder and said fluid motors, springs resisting the movement of said pistons under fluid pressure and means for replenishing the master cylinder with fluid during the return stroke of the piston, said conduit being open throughout its length and having a portion restricted in cross section constituting a retarding means for fluid returning to the cylinder by virtue of the movement of said pistons under the action of said springs.

5. In a hydraulic brake system, a fluid pressure producing device including a cylinder and a manually movable piston in said cylinder for building up fluid pressure upon its compression stroke and for creating a depression during its return stroke to draw replenishing fluid into the cylinder, a brake shoe actuating fluid motor operated by fluid pressure, a conduit interconnecting said cylinder and said fluid motor, and means for retarding the return flow of fluid to said cylinder during the return stroke of said piston, said means comprising a portion of restricted cross section formed in said conduit.

6. In a hydraulic brake system, a master fluid pressure producing cylinder having a movable piston for building up fluid pressure therein upon the compression stroke of the piston, valve mechanism associated with the piston for admitting fluid to the cylinder in front of the piston during its return stroke, a brake shoe actuating fluid motor including a movable piston for actuating a brake shoe, a spring for resisting the movement of the fluid motor piston when fluid pressure is applied thereto, a conduit interconnecting the master cylinder and the fluid motor for conducting fluid pressure thereto, and a restriction forming a part of the conduit for retarding the return flow of fluid to the cylinder as said fluid motor piston moves under the action of said spring.

7. In a hydraulic brake system, a master fluid pressure producing cylinder having a movable piston for building up fluid pressure therein upon the compression stroke of the piston, valve mechanism associated with the piston for admitting fluid to the cylinder in front of the piston during its return stroke, a brake shoe actuating fluid motor including a movable piston for actuating a brake shoe, a spring for resisting the movement of the fluid motor piston when fluid pressure in applied thereto, a conduit interconnecting the master cylinder and the fluid motor for conducting fluid pressure thereto, a restriction forming a part of said conduit to retard the return flow of fluid under the action of said spring, and a passage communicating with said master cylinder only when its piston is in a fully retracted position for permitting the egress of surplus fluid from the cylinder as it is displaced by fluid returning from the fluid motor.

8. In a hydraulic brake system, a fluid pressure producing device having a manually movable piston for building up fluid pressure therein, a brake shoe operating fluid motor comprising a cylinder and a piston, a conduit interconnecting said fluid pressure producing device and said cylinder for subjecting the fluid motor piston to fluid pressure, a bleeder valve communicating with said cylinder and a restriction in the conduit for retarding the return flow of fluid to the fluid pressure producing device during the return stroke of its piston.

9. In a hydraulic brake system, a fluid motor for actuating the brake shoes of a vehicle wheel brake including a cylinder and a piston movable therein, an air bleeder valve for permitting the egress of air from said cylinder to the atmosphere and a conduit for conducting fluid pressure to said cylinder, said conduit having a restriction therein to retard the return flow of fluid from the cylinder.

10. In a hydraulic brake system, a fluid motor for actuating a brake shoe including a part within which fluid under pressure is received, a bleeder valve for permitting the egress of air from said part to the atmosphere, and a conduit for conducting fluid under pressure to said fluid receiving part, said conduit having a restriction to retard the return flow of fluid therethrough.

In witness whereof, we hereunto subscribe our names this 1st day of November, 1928.
MALCOLM LOUGHEAD.
WALLACE F. OLIVER.